United States Patent
Kobayashi

(10) Patent No.: US 7,272,415 B2
(45) Date of Patent: Sep. 18, 2007

(54) TELEPHONE SYSTEM ENABLING OPERATION OF A TELEPHONE SET BY WAY OF A PORTABLE TERMINAL

(75) Inventor: Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 11/384,521

(22) Filed: Mar. 21, 2006

(65) Prior Publication Data

US 2006/0160568 A1 Jul. 20, 2006

Related U.S. Application Data

(63) Continuation of application No. 10/374,710, filed on Feb. 27, 2003, now Pat. No. 7,035,668.

(30) Foreign Application Priority Data

Feb. 28, 2002 (JP) ............................. 2002-054376

(51) Int. Cl.
 *H04B 1/38* (2006.01)
(52) U.S. Cl. ............................. 455/556.1; 455/556.2; 455/557; 379/201.04; 379/201.05
(58) Field of Classification Search ............ 455/556.1, 455/415, 556.2, 435.1, 557, 555, 426.1, 550.1, 455/575.1, 424, 425, 456.5, 456.6, 554.2, 455/554.1, 419, 420, 418, 551, 552.1, 145; 375/136, 149, 219; 379/88.17, 67.17, 201, 379/89, 96, 200, 352, 718, 399, 354, 355, 379/110, 368, 433, 388, 201.04, 201.05; 345/156, 418, 520, 522; 715/801, 802, 781
See application file for complete search history.

(56) References Cited

U.S. PATENT DOCUMENTS

| | | | | |
|---|---|---|---|---|
| 5,377,261 | A * | 12/1994 | Baals et al. ............ | 379/201.04 |
| 5,633,912 | A | 5/1997 | Tsoi | |
| 5,956,487 | A | 9/1999 | Venkatraman et al. | |
| 6,170,007 | B1 | 1/2001 | Venkatraman et al. | |
| 6,246,988 | B1 * | 6/2001 | Schier ........................ | 704/273 |
| 6,259,905 | B1 * | 7/2001 | Berkowitz et al. .......... | 455/401 |
| 6,389,397 | B1 * | 5/2002 | Otto ........................... | 704/270 |
| 6,400,806 | B1 * | 6/2002 | Uppaluru ................ | 379/88.02 |
| 6,401,905 | B1 * | 6/2002 | Ballarotti .................... | 198/394 |
| 6,628,971 | B1 * | 9/2003 | Yoon et al. ................. | 455/566 |
| 6,799,163 | B2 * | 9/2004 | Nolan ........................ | 704/273 |
| 6,819,219 | B1 * | 11/2004 | Bolle et al. ................ | 340/5.52 |

(Continued)

FOREIGN PATENT DOCUMENTS

JP         8-214105         8/1996

(Continued)

*Primary Examiner*—Edward F. Urban
*Assistant Examiner*—Charles Chow
(74) *Attorney, Agent, or Firm*—Foley & Lardner LLP

(57) ABSTRACT

In a telephone system which includes a main device and a telephone set connected to the main device and which further includes a portable terminal having a display unit, the portable terminal further has an interface portion for interfacing the display unit with the main device to present, as an operation screen, an image of the telephone set on a web page displayed on the display unit and to enable to use a function of the telephone set on the portable terminal by an operation on the operation screen displayed on the display unit. Preferably, the interface portion has an IP (Internet Protocol) communication network for use in connecting the portable terminal to the main device. The portable terminal is, typically, a PDA (Personal Digital Assistant).

18 Claims, 10 Drawing Sheets

U.S. PATENT DOCUMENTS

| | | | |
|---|---|---|---|
| 6,931,000 B2 | 8/2005 | Otsuka | |
| 7,035,668 B2 * | 4/2006 | Kobayashi | 455/556.1 |
| 2001/0025307 A1 | 9/2001 | Venkatraman et al. | |
| 2001/0034777 A1 | 10/2001 | Venkatraman et al. | |
| 2001/0034778 A1 | 10/2001 | Venkatraman et al. | |
| 2001/0034779 A1 | 10/2001 | Venkatraman et al. | |
| 2001/0034780 A1 | 10/2001 | Venkatraman et al. | |
| 2001/0034781 A1 | 10/2001 | Venkatraman et al. | |
| 2001/0044836 A1 | 11/2001 | Venkatraman et al. | |
| 2001/0046282 A1 * | 11/2001 | Bailey, III | 379/93.25 |
| 2002/0066041 A1 * | 5/2002 | Lemke | 713/202 |
| 2002/0133636 A1 | 9/2002 | Venkatraman et al. | |
| 2003/0095644 A1 * | 5/2003 | St-Onge et al. | 379/88.17 |
| 2003/0156097 A1 * | 8/2003 | Kakihara et al. | 345/156 |
| 2003/0208558 A1 | 11/2003 | Venkatraman et al. | |
| 2004/0039930 A1 * | 2/2004 | Ohmori et al. | 713/193 |

FOREIGN PATENT DOCUMENTS

| | | |
|---|---|---|
| JP | 9-084091 | 3/1997 |
| JP | 10-149270 | 6/1998 |
| JP | 11-122589 | 4/1999 |
| JP | 11-136714 | 5/1999 |
| JP | 2000-282738 A | 10/2000 |
| JP | 2001-157154 | 6/2001 |
| JP | 2001-169321 A | 6/2001 |
| JP | 2001-275160 | 10/2001 |
| JP | 2002-538667 A | 11/2002 |

* cited by examiner

TELEPHONE SYSTEM ENABLING OPERATION OF A TELEPHONE SET BY WAY OF A PORTABLE TERMINAL

CROSS-REFERENCE TO RELATED PATENT APPLICATIONS

This application is a continuation of application Ser. No. 10/374,710, filed Feb. 27, 2003, now U.S. Pat. No. 7,035,668, and based on Japanese Patent Application No. 2002-054376, filed Feb. 28, 2002, by Yoshikazu KOBAYASHI. This application claims only subject matter disclosed in the parent application and therefore presents no new matter.

BACKGROUND OF THE INVENTION

This invention relates to a telephone system which includes a main device and a telephone set connected to the main device and which further includes a portable terminal connected to the main device through an IP (Internet Protocol) communication network.

In recent years, a so-called internet cafe is wide spread. The internet cafe is a facility, such as a coffee shop or a hamburger shop, which provides a user with a service of offering access or connection to the Internet via a wireless LAN (Local Area Network).

By the above-mentioned service, data communication over IP makes a good progress. As a natural consequence, it is desired to also enjoy smooth speech communication.

SUMMARY OF THE INVENTION

It is an object of this invention to provide an improved telephone system including a portable terminal which enables a user out of doors to use a function of a telephone set accommodated in an indoor telephone system.

It is another object of this invention to provide a portable terminal which enables a user out of doors to use a function of a telephone set accommodated in an indoor telephone system.

Telephone systems according to this invention and portable terminals according to this invention are as follows:

(1) A telephone system including a main device and a telephone set connected to the main device, the telephone system comprising a portable terminal including a display unit, the portable terminal comprising interface means for interfacing the display unit with the main device to present, as an operation screen, an image of the telephone set on a web page displayed on the display unit and to enable to use a function of the telephone set on the portable terminal by an operation on the operation screen displayed on the display unit.

(2) A telephone system as described in Paragraph (1), wherein:
the interface means comprises an IP (Internet Protocol) communication network for use in connecting the portable terminal to the main device, the interface means interfacing the display unit with the main device by the use of the IP communication network to present, as the operation screen, the image of the telephone set in an HTML format on the web page displayed on the display unit and to enable to use the function of the telephone set on the portable terminal by the operation on the operation screen displayed on the display unit.

(3) A telephone system as described in Paragraph (2), wherein:
the portable terminal is a PDA (Personal Digital Assistant).

(4) A telephone system as described in Paragraph (2), wherein:
the portable terminal is a PDA (Personal Digital Assistant); each of the portable terminal and the main device comprising a VoIP (Voice over IP) portion for carrying out speech communication with each other by the use of the IP communication network.

(5) A telephone system as described in Paragraph (2), wherein:
the portable terminal is a PDA (Personal Digital Assistant);
the telephone system further comprising at least one of a PHS (Personal Handyphone System) and a mobile telephone, the at least one of the PHS and the mobile telephone having a speech communication function with the main device.

(6) A telephone system as described in Paragraph (2), wherein:
the portable terminal is one of a PHS (Personal Handyphone System) and a mobile telephone, the one of the PHS and the mobile telephone having a speech communication function with the main device.

(7) A portable terminal for use in a telephone system which includes a main device and a telephone set connected to the main device and which comprises the portable terminal including a display unit, the portable terminal comprising interface means for interfacing the display unit with the main device to present, as an operation screen, an image of the telephone set on a web page displayed on the display unit and to enable to use a function of the telephone set on the portable terminal by an operation on the operation screen displayed on the display unit.

(8) A portable terminal as described in Paragraph (7), wherein:
the interface means comprises an IP (Internet Protocol) communication network for use in connecting the portable terminal to the main device, the interface means interfacing the display unit with the main device by the use of the IP communication network to present, as the operation screen, the image of the telephone set in an HTML format on the web page displayed on the display unit and to enable to use the function of the telephone set on the portable terminal by the operation on the operation screen displayed on the display unit.

(9) A portable terminal as described in Paragraph (8), wherein:
the portable terminal is a PDA (Personal Digital Assistant).

(10) A portable terminal as described in Paragraph (8), wherein:
the portable terminal is a PDA (Personal Digital Assistant);
the portable terminal comprising a VoIP (Voice over IP) portion for carrying out speech communication with the main device by the use of the IP communication network.

(11) A portable terminal as described in Paragraph (8), wherein:
the portable terminal is one of a PHS (Personal Handyphone System) and a mobile telephone, the one of the PHS and the mobile telephone having a speech communication function with the main device.

DESCRIPTION OF THE PREFERRED EMBODIMENTS

Figure 1:
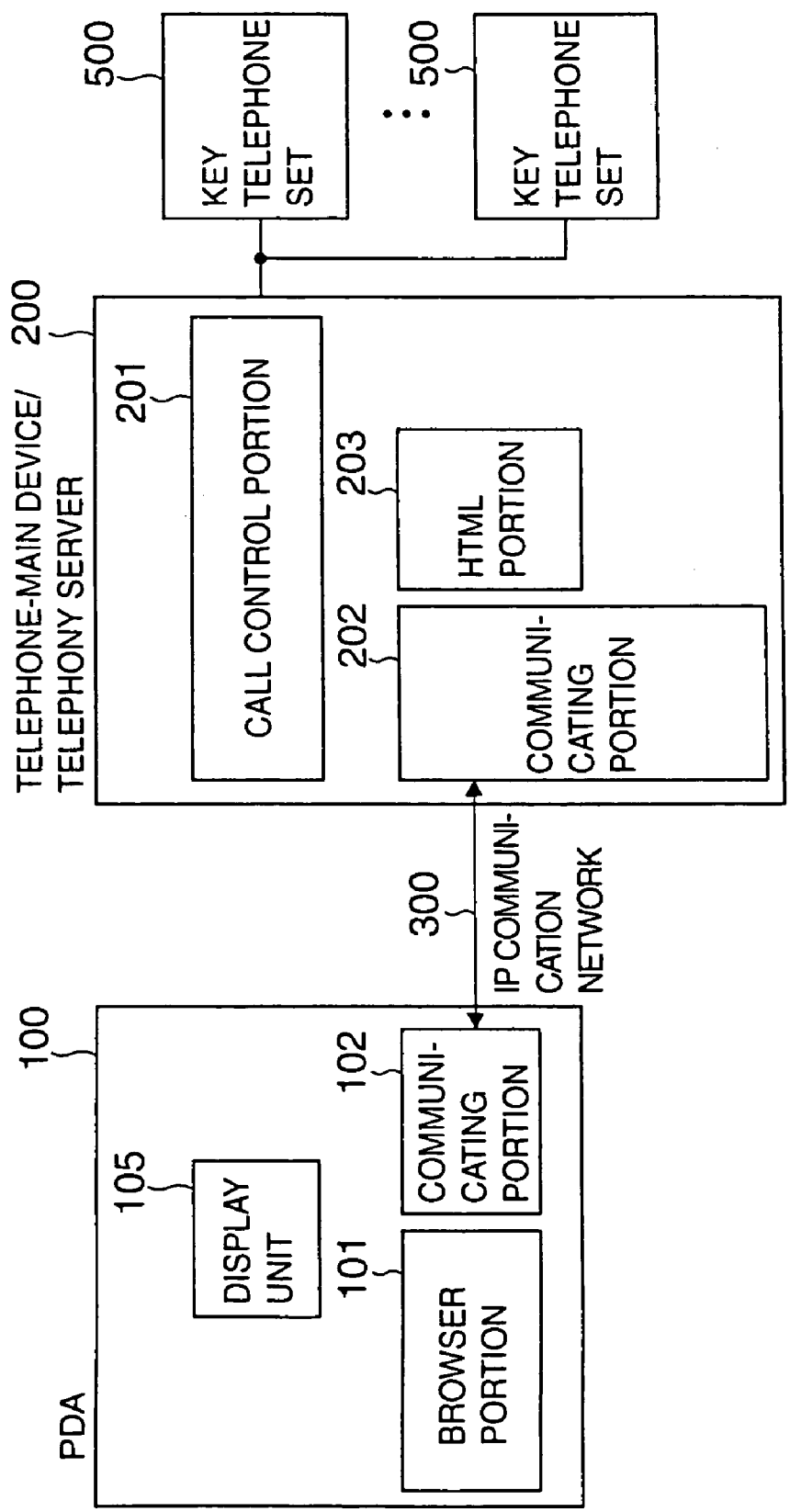
FIG. 1 is a block diagram of a telephone system according to a first embodiment of this invention.

Now, description will be made of several preferred embodiments of this invention with reference to the drawing.

Referring to FIG. 1, a telephone system according to a first embodiment of this invention includes a telephone-main device/telephony server 200 and telephone sets 500 each of which is connected to the telephone-main device/telephony server 200 by wire. Alternatively, the telephone-main device/telephony server 200 and each of the telephone sets 500 are connected by radio.

The telephone system further includes a PDA (Personal Digital Assistant) 100 as a portable terminal and an IP (Internet Protocol) communication network 300 for use in connecting the PDA 100 to the telephone-main device/telephony server 200.

The PDA 100 includes a display unit 105, a browser portion 101, and a communicating portion (IP communicating portion) 102. A combination of the browser portion 101 and the communicating portion 102 serves, in cooperation with the IP communication network 300, as an interface portion. The interface portion is for interfacing the display unit 105 with the telephone-main device/telephony server 200 by the use of the IP communication network 300 to present, as an operation screen, an image of a specific one of the telephone sets 500 in an HTML format on a web page displayed on the display unit 105 and to enable to use a function of the specific one of the telephone sets 500 on the PDA 100 by an operation on the operation screen displayed on the display unit 105.

More specifically, the telephone-main device/telephony server 200 has a call control portion 201, a communicating portion (IP communicating portion) 202, and a HTML (Hyper Text Markup Language) portion 203. The IP communication network 300 connects the communicating portion (IP communicating portion) 102 of the PDA 100 and the communicating portion (IP communicating portion) 202 of the telephone-main device/telephony server 200.

As a specific example of the telephone-main device/telephony server 200, assumption is made of a key telephone-main device of a key telephone system, a PBX (Private Branch Exchange), a home gateway, an office gateway, an IAD (Integrated Access Device), and so on. By way of example, description will hereinafter be directed to a case where the telephone-main device/telephony server 200 is the key telephone-main device. However, this invention is not restricted to the key telephone-main device but may be applicable to other various types of the telephone-main device/telephony server 200.

The key telephone-main device which serves as the telephone-main device/telephony server 200 has the call control portion 201 for providing a telephone exchange service as the key telephone-main device. A plurality of key telephone sets 500 are connected to the key telephone-main device and controllably operated by the call control portion 201. Each of the key telephone sets 500 has keys and function keys arranged in a format defined for each key telephone system (that is, for each key telephone-main device). For example, one of a simple telephone set without function keys, a multifunctional telephone set with 6 function keys, a multifunctional telephone set with 8 function keys, a multifunctional telephone set with 16 function keys is connected to the key telephone-main device as the key telephone set 500. For each of the key telephone sets 500 connected to the key telephone-main device, an operation screen is given.

For the key telephone set 500 of a particular type connected to the key telephone-main device, the HTML portion 203 of the key telephone-main device generates the operation screen, which is a telephone set image in the HTML format, so that the operation screen can be seen on the browser portion 101. The telephone set image generated by the HTML portion 203 serves as a virtual key telephone set.

Accessed from the PDA 100 through the IP communication network 300, the virtual key telephone set is interfaced to the browser portion 101 of the PDA 100 through the communicating portion 202 of the key telephone-main device, the IP communication network 300, and the communicating portion 102 of the PDA 100. The browser portion 101 makes the display unit 105 of the PDA 100 display the telephone set image as the virtual key telephone set.

Figure 2:
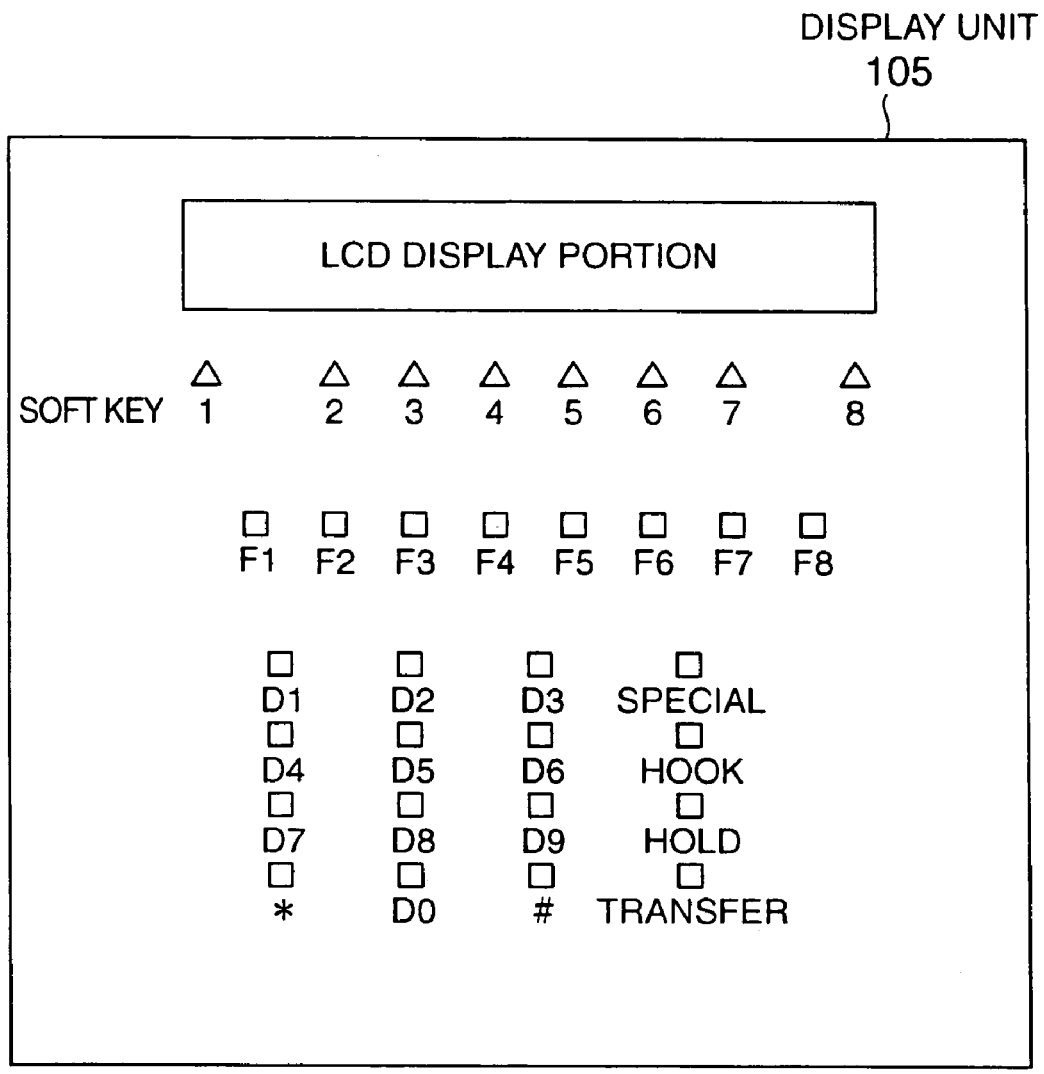
FIG. 2 is a view showing an image of a 8-function-key multifunctional telephone set displayed on a display unit of a PDA illustrated in FIG. 1.
Figure 3:
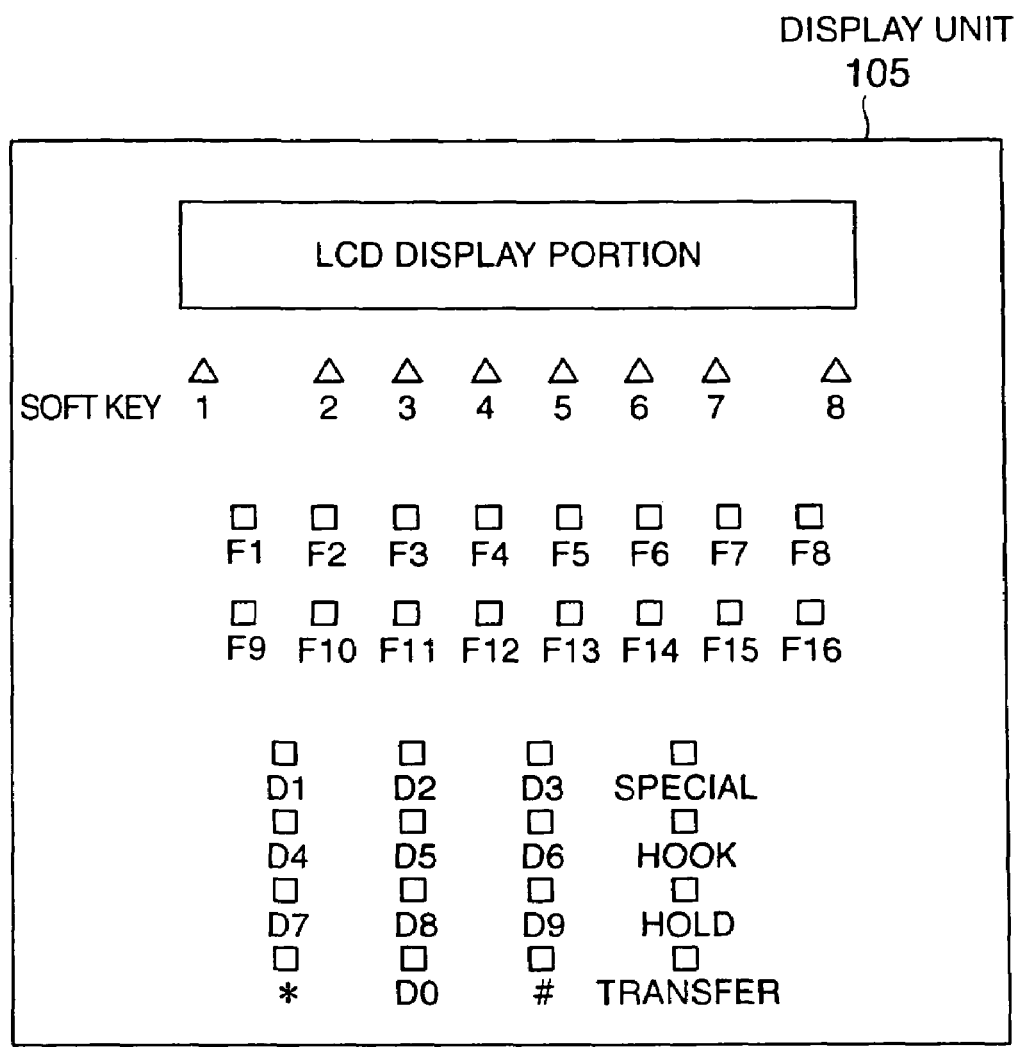
FIG. 3 is a view showing an image of a 16-function-key multifunctional telephone set displayed on the display unit of the PDA illustrated in FIG. 1.

Referring to FIGS. 2 and 3, the display unit 105 displays the telephone set image. Referring to FIG. 2, the key telephone set 500 is a multifunctional telephone set having 8 function keys (F1 to F8) and the display unit 105 displays the telephone set image of the 8-function-key multifunctional telephone set as the virtual telephone set. Referring to FIG. 3, the key telephone set 500 is a multifunctional telephone set having 16 function keys (F1 to F16) and the display unit 105 displays the telephone set image of the 16-function-key multifunctional telephone set as the virtual telephone set.

Thus, the key telephone-main device and the PDA 100 are connected through the IP communication network 300 and the operation screen (key arrangement) in the HTML format as the telephone set image of the key telephone set 500 is interfaced to the PDA 100 as the virtual telephone set on a web page displayed on the display unit 105 of the PDA 100. In this manner, the function of the key telephone set 500 is available on the PDA 100.

Figure 4:
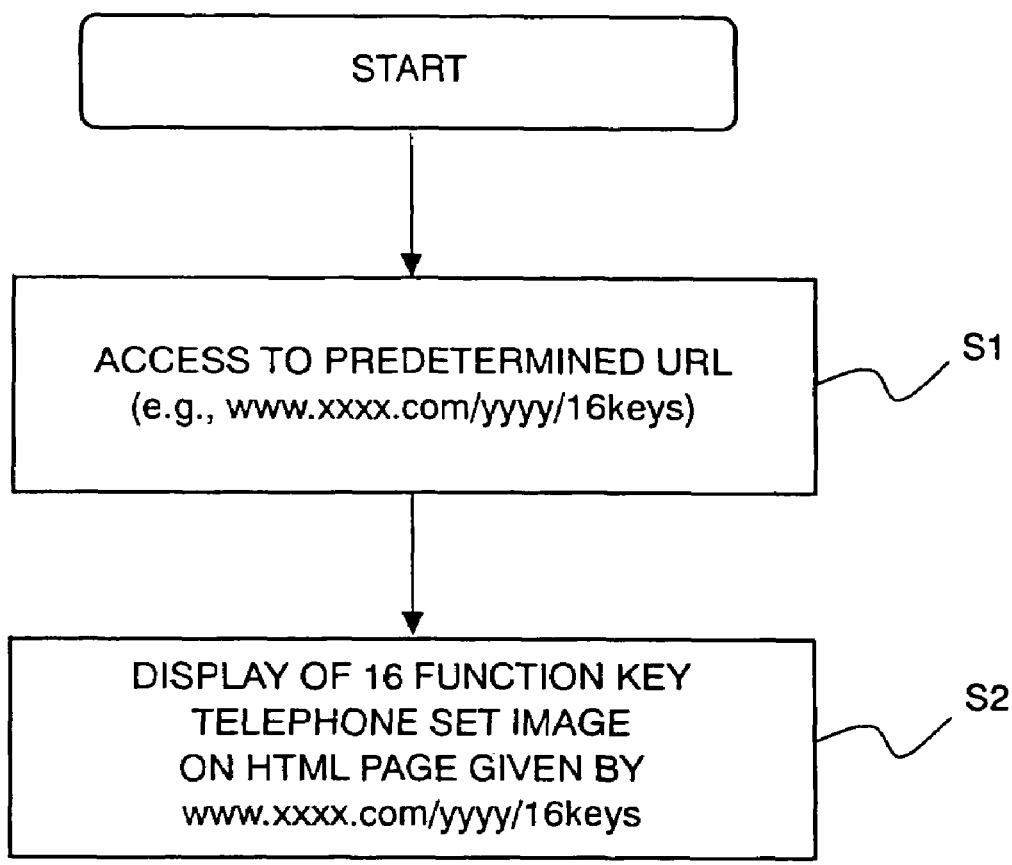
FIG. 4 is a flow chart for describing a sequence of steps for displaying a telephone set image on the PDA in FIG. 1 (first example of transmission)

Referring to FIG. 4, description will be made of a sequence of steps of displaying the telephone set image on the PDA 100 (first example of transmission).

It is assumed that the PDA 100 carries out call transmission. The PDA 100 accesses through the IP communication network 300 to the telephone apparatus/telephony server 200 by the use of a predetermined URL (for example, WWW.xxxx.com/yyyyy/16keys) (step S1). The URL (WWW.xxxx.com/yyyyy/16keys) represents a multifunctional telephone set having 16 function keys (F1 to F16) for Mr. yyyyy in xxxx company.

As a consequence, the telephone set image of the multifunctional telephone set of 16 function keys (F1 to F16) is displayed in the HTML format on the web page given by WWW.xxxx.com/yyyyy/16keys (step S2).

Figure 5:
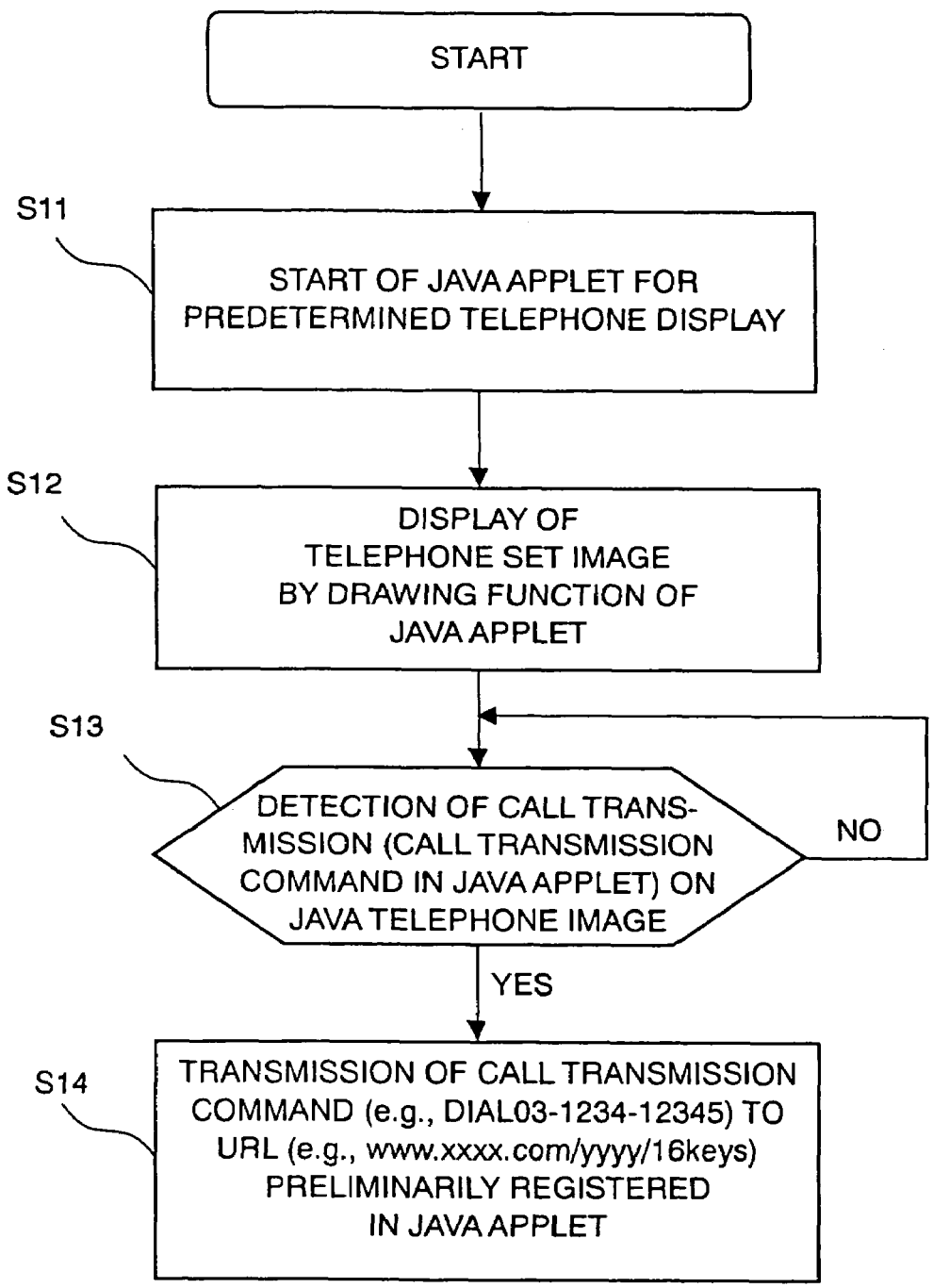
FIG. 5 is a flow chart for describing a sequence of steps for displaying a telephone set image on the PDA in FIG. 1 (second example of transmission)

Referring to FIG. 5, description will be made of another sequence of steps for displaying the telephone set screen on the PDA 100 (second example of transmission). At first, the PDA 100 starts a JAVA (registered trademark) applet for a predetermined telephone set display (step S11). By the use of a drawing function of the JAVA (registered trademark) applet, the telephone set image is displayed (step S12). Subsequently, judgment is made of whether or not call transmission (call transmission command in the JAVA (registered trademark) applet) on the JAVA (registered trademark) telephone set image is detected (step S13). If the call transmission (call transmission command in the JAVA (registered trademark) applet) on the JAVA (registered trademark) telephone set image is detected, the call transmission command (for example, DIAL03-1234-12345) is transmitted to a URL (for example, WWW.xxxx.com/yyyyy/16keys) preliminarily registered in the JAVA (registered trademark) applet (step S14).

Figure 6:
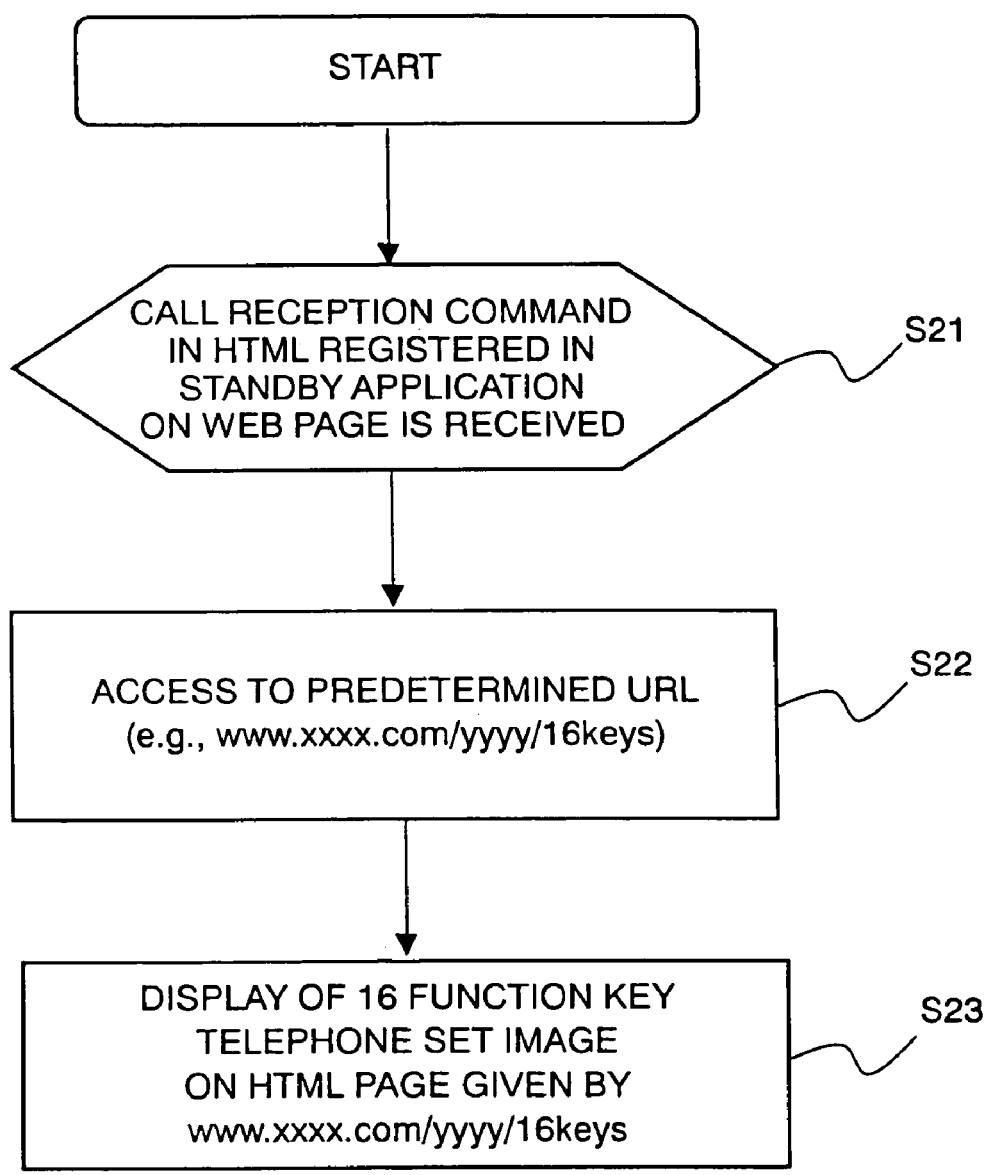
FIG. 6 is a flow chart for describing a sequence of steps for displaying a telephone set image on the PDA in FIG. 1 (first example of reception)

Referring to FIG. 6, description will be made of a sequence of steps for displaying the telephone set image on the PDA 100 (first example of reception). At first, judgment is made of whether or not a call reception command in a HTML format registered in a standby application on the web page displayed on the PDA 100 is received (step S21). If the result of judgment is YES, the PDA 100 accesses through the IP communication network 300 to the telephone apparatus/telephony server 200 by the use of a predetermined URL (for example, WWW.xxxx.com/yyyyy/16keys) (step S22).

As a consequence, the telephone set image of the multifunctional telephone set of 16 function keys (F1 to F16) is displayed in the HTML format on the web page given by WWW.xxxx.com/yyyyy/16keys (step S23).

Figure 7:
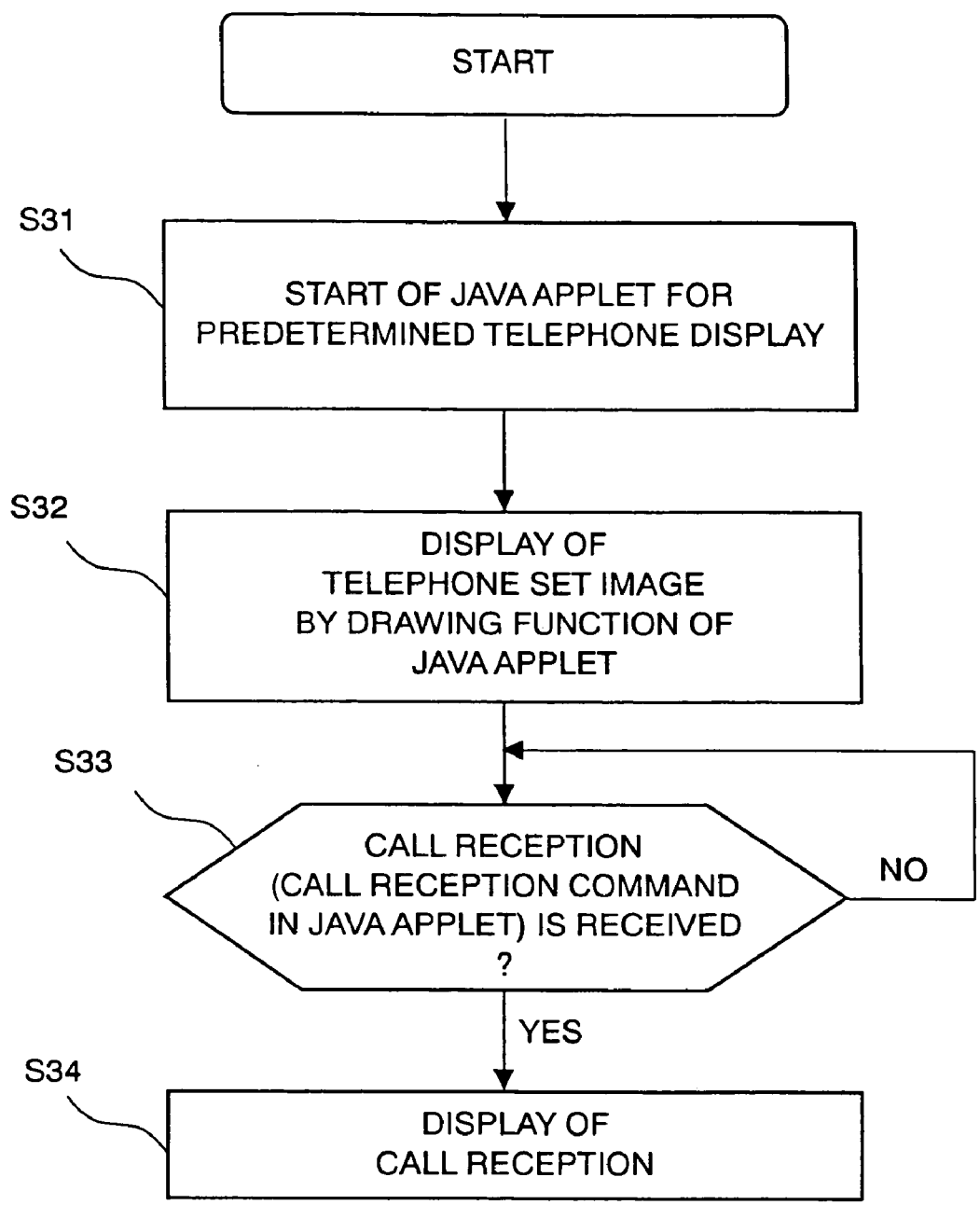
FIG. 7 is a flow chart for describing a sequence of steps for displaying a telephone set image on the PDA in FIG. 1 (second example of reception)

Referring to FIG. 7, description will be made of a sequence of displaying the telephone set screen on the PDA 100 (second example of reception). At first, the PDA 100 starts a JAVA (registered trademark) applet for a predetermined telephone set display (step S31). By the use of a drawing function of the JAVA (registered trademark) applet, the telephone set image is displayed (step S32). Subsequently, judgment is made of whether or not call reception (reception command in the JAVA (registered trademark) applet) is detected (step S33). If the call reception is detected, the call reception is displayed (step S34).

Turning back to FIG. 1, in this embodiment, telephone service of the key telephone set 500 is available on the PDA 100 as described above.

In the past, if a user feels unsatisfied with his key telephone set of 8 function keys because of shortage of functions and wants to use a key telephone set of 16 function keys, there is no other way but buying a new telephone set. This invention provides a service to enable the use of a new telephone set by simply changing a virtual telephone set generated by the HTML portion 203.

If a visitor has the PDA 100, he can participate in communication as if he has a key telephone terminal. This invention provides a service to enable participation in key-telephone communication by the PDA 100.

In addition, simply by carrying the PDA used in business, the user can communicate by the use of his favorite virtual telephone set at any time at any place as far as IP communication is available, even if he is moving, for example, between a principal office and a branch office or even if he is out-of-doors.

Herein, access authentication upon carrying the PDA from place to place is not specifically restricted. For example, the access authentication may be a typical one using a user name and a password on the Internet or may be a type using a random number varying from time to time. The authentication is not restricted to one for each PDA. A plurality of virtual telephone sets may simultaneously be displayed by a plurality of authentications.

The IP communication network 300 is not restricted to a private-network wired LAN but may be any outdoor network, for example, a radio LAN (Local Area Network), a FWA (Fixed Wireless Access), LAN connection from an Internet cafe, and mobile access through PHS (Personal Handyphone System) or a mobile telephone.

The PDA 100 may be any data terminal as far as it has a browser. For example, use may be made of a wristwatch-type browser data terminal, which is a wearable data terminal called a wearable PC (Personal Computer), or a hand-mirror type data terminal.

A telephone call can be made not only by a key operation of the key telephone set but by a telephone-directory-based operation as available on a giant liquid crystal display of the key telephone set.

As regards speech communication, no specific restriction is imposed. The speech communication can be carried out by any voice, such as VoIP (Voice over IP) or a voice on PHS, as far as it is available in communication.

Figure 8:
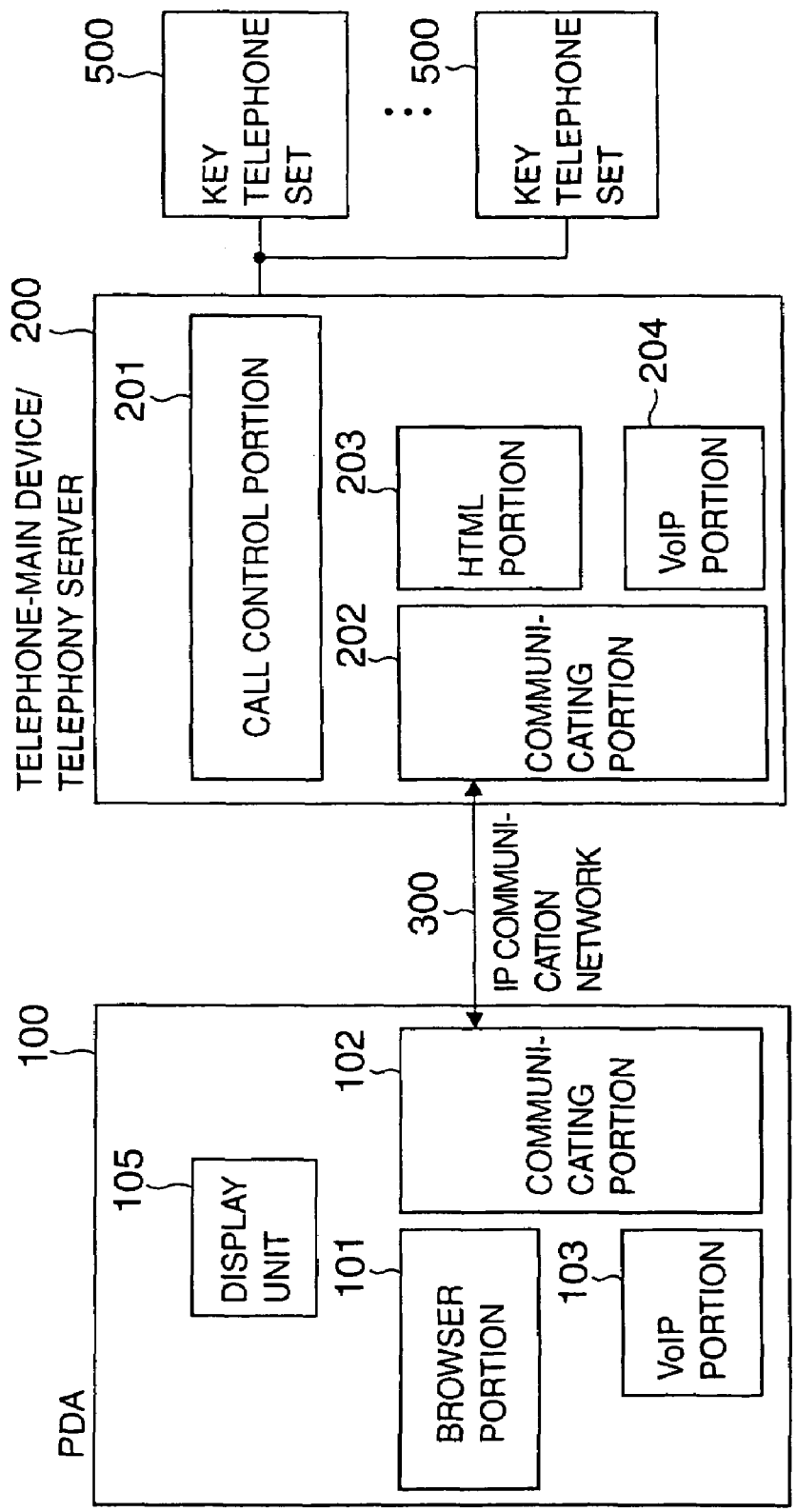
FIG. 8 is a block diagram of a telephone system according to a second embodiment of this invention.

Referring to FIG. 8, a telephone system according to a second embodiment of this invention is similar to that described in conjunction with the first embodiment except that each of the PDA 100 and the telephone apparatus/telephony server 200 further comprises a VoIP (Voice over IP) portion. Specifically, the PDA 100 comprises the browser portion 101, the communicating portion 102, and a VoIP (Voice over IP) portion 103. The telephone apparatus/telephony server 200 comprises the call control portion 201, the communicating portion 202, the HTML portion 203, and a VoIP portion 204. The PDA 100 and the telephone apparatus/telephony server 200 are connected via the IP communication network 300.

Generally, each of the VoIP portions 103 and 204 comprises a DSP (Digital Signal Processor) or a soft DSP and is excellent in calculating ability. Utilizing the calculating ability, the VoIP portion 103 or 204 not only serves to convert the voice into VoIP but also has means for detecting whether or not the voice coincides with a voiceprint preliminarily registered. In accordance with a telephone set image pattern table corresponding to a person having the voiceprint preliminarily registered, the PDA requesting the telephone set image is automatically set to a user's virtual telephone set memorized in the call control portion 201. The automatic setting is carried out as follows. In case where the above-mentioned recognition of the voiceprint is carried out in the VoIP portion 204, the virtual telephone set generated in the HTML portion 203 is matched under control of the call control portion 201.

In case where the VoIP portion 103 carries out the above-mentioned recognition of the voiceprint, the virtual telephone set of the corresponding user stored in a cache of the browser portion 101 may be displayed to wait the operation.

In case where the VoIP portion 103 can not carry out the recognition, the VoIP portion 204 may be requested to carry out the recognition so that the processing load of the telephone apparatus/telephony server 200 may be reduced.

Figure 9:
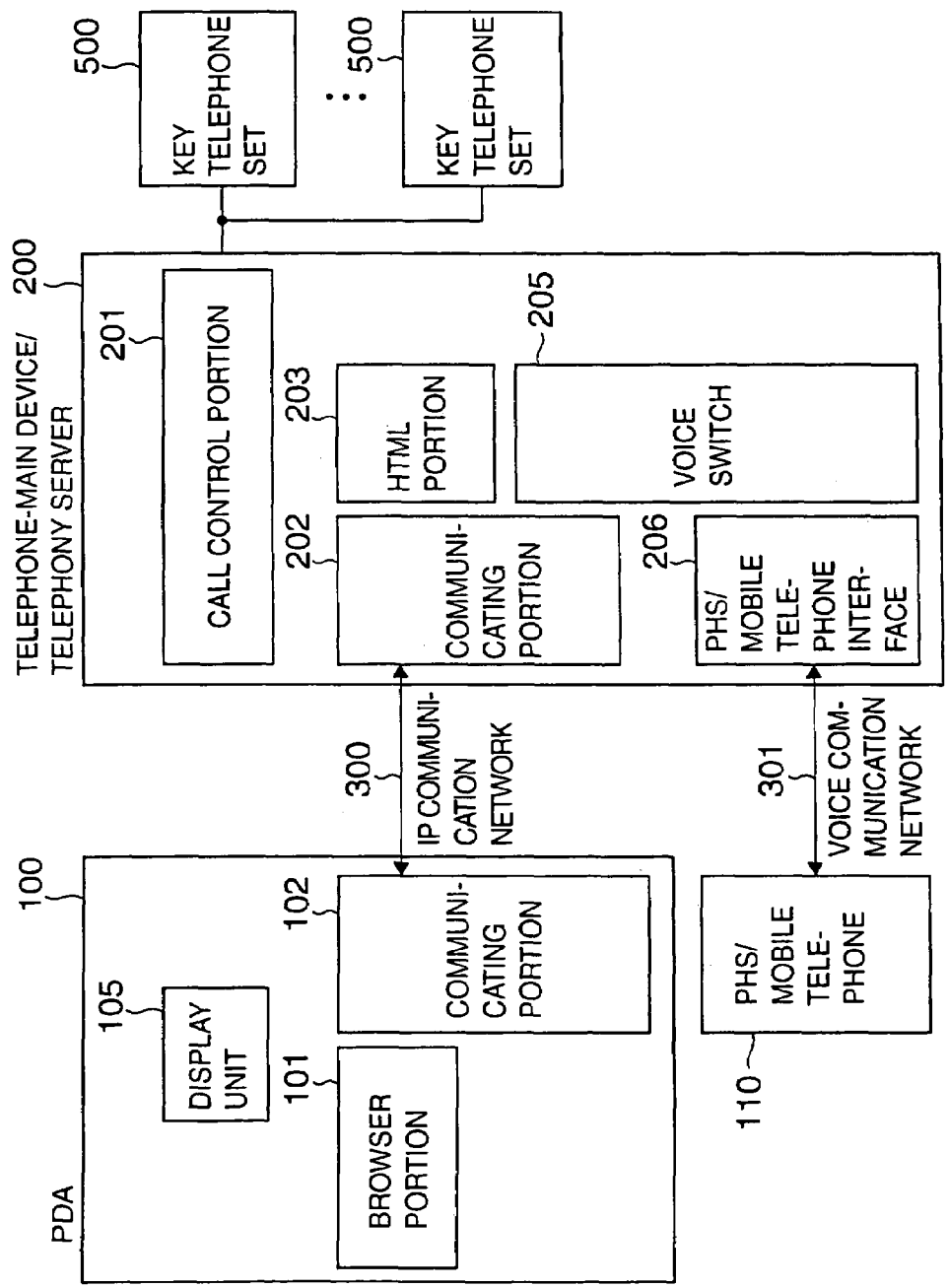
FIG. 9 is a block diagram of a telephone system according to a third embodiment of this invention.

Referring to FIG. 9, a telephone system according to a third embodiment of this invention is different from the first and the second embodiments in the following respects. In the first and the second embodiments, communication is carried out by the use of a speech device on the PDA 100. In the third embodiment, the PDA 100 is combined with a PHS/mobile telephone 110 as a voice terminal other than the PDA 100. The telephone apparatus/telephony server 200 further comprises a PHS/mobile telephone interface 206 connected to the PHS/mobile telephone 110 through a voice communication network 301 and a voice switch 205 connected to the PHS/mobile telephone interface 206.

The PHS/mobile telephone 110 may dynamically be changed, for example, between an office telephone during a work time and a personal mobile telephone during the night. The call control portion 201 may automatically judge such dynamic change.

Figure 10:
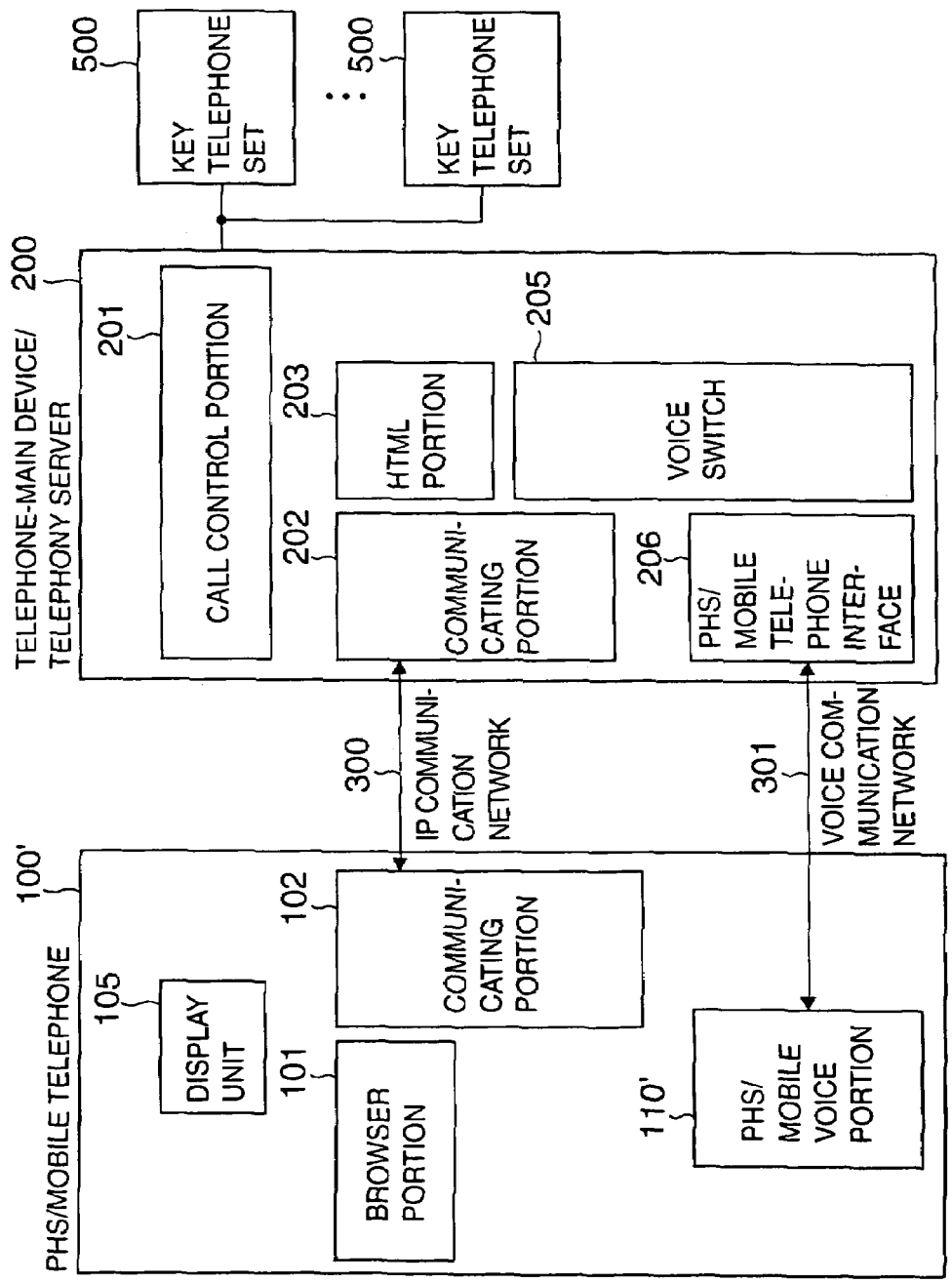
FIG. 10 is a block diagram of a telephone system according to a fourth embodiment of this invention.

Referring to FIG. 10, a telephone system according to a fourth embodiment will be described.

In the third embodiment illustrated in FIG. 9, the PDA 100 comprises the display unit 105, the browser portion 101, and the communicating portion (IP communicating portion) 102. In the fourth embodiment, a PHS/mobile telephone 100' comprises the display unit 105, the browser portion 101, and the communicating portion (IP communicating portion) 102. The PHS/mobile telephone 100' has a PHS/mobile voice portion 110'. The PHS/mobile voice portion 110' is connected to the PHS/mobile telephone interface 206 of the telephone apparatus/telephony server 200 through the voice communication network 301.

In a combination of the PDA and the PHS in the third embodiment in FIG. 9, IP telephone can be used simultaneously with IP communication. On the other hand, in a commonly-used browser-adapted telephone set, the IP communication and the speech communication are not simultaneously available.

In the fourth embodiment in FIG. 10, during speech communication, an operation on a HTML page is notified by a speech signal, for example, by a ring pattern of a predetermined frequency. Thus, even during the speech communication, the operation of pressing any key on the HTML page, such as a hold key and a transfer key, is interfaced.

Although the several preferred embodiments have been described so far, this invention is not restricted thereto but may be modified in various other manners.

For example, provision may be made of a key for designating the degree of priority of QoS (Quality of Service) for transmission and reception of the HTML page and transmission and reception of speech. A provider may be selected by the LCR (Least Cost Routing) function. No restriction is imposed in these respects.

In the embodiments in FIGS. 1, 8, and 9, the portable terminal having the display unit for displaying the HTML page is the PDA 100. Furthermore, in the embodiment in FIG. 10, the portable terminal having the display unit for displaying the HTML page is the PHS or the mobile telephone 100'. However, in this invention, the portable terminal having the display unit for displaying the HTML page is not restricted to the PDA, the PHS, or the mobile telephone but may be any other portable terminal, such as a personal computer having a browser portion. In order to display the HTML page, use may be made of a browser portion of a car navigator with an internal computer and a browser portion of a refrigerator, a video deck, or a set-top box with an internal computer.

In the past, a speech-dedicated or single-purpose telephone set is accommodated in a telephone exchange. Even in a technique, called CTI (Computer Telephony Integration), in which a telephone operation is initiated from a personal computer, speech communication is carried out via a telephone set after the telephone operation on the personal computer.

In the past, there is no idea of using the PDA, recently wide spread, not only in sending/reading E-mail messages but also in telephone communication at any place through the exchange installed in the office.

In recent years, there arises an idea of using the PDA as a general-purpose telephone set and connecting the PDA in the manner similar to an ordinary telephone set. However, in this event, the merit of the multifunctional telephone set can not be enjoyed.

With a personal computer at a desk in the office, a voice mail can be listened by simply operating a key. However, in order to listen the same voice mail from a place other than the desk in the office, it is often necessary to enter a difficult access code, a personal BOX number, and an authentication number. Thus, troublesome operation is required.

On the other hand, in this invention, the voice mail can be listened by the portable terminal by simply operating a key, like the personal computer at the desk in the office. Thus, work efficiency is remarkably increased.

What is claimed is:

1. A telephone system including a main device and a telephone set connected to said main device, said telephone system comprising a portable terminal including a display unit, said portable terminal comprising interface means for interfacing said display unit with said main device to present, as an operation screen, an image of said telephone set on a web page displayed on said display unit and to enable to use a function of said telephone set on said portable terminal by an operation on the operation screen displayed on said display unit, wherein said portable terminal includes a first voice authentication means and said main device includes a second voice authentication means, in which a user of said portable terminal is authenticated to access said telephone set by said telephone system first attempting to authenticate speech output by said user and received by said portable terminal using voice data stored in a first memory of said portable terminal for said first voice authentication means to determine whether or not there is a match, and if there is not a match, the user of said portable terminal is next attempted to be authenticated by said telephone system by using voice data stored in a second memory of said main device and said speech output by said user, as forwarded to said main device by said portable terminal, for said second voice authentication means to determine whether or not there is a match, and if both of said first and second voice authentication means do not determine that there is a match, the user is not allowed to use said portable terminal to access said telephone set.

2. A telephone system as claimed in claim 1, wherein said portable terminal is a PDA (Personal Digital Assistant).

3. A telephone system as claimed in claim 1, wherein said portable terminal is a PDA (Personal Digital Assistant), wherein each of said portable terminal and said main device comprising a VoIP (Voice over IP) portion for carrying out speech communication with each other by the use of an IP communication network, and wherein said portable terminal is configured to allow the user to simultaneously carry out speech communication using said VoIP portion and to carry out data communication using the web page displayed on said display unit.

4. A telephone system as claimed in claim 1, wherein said portable terminal is a PDA (Personal Digital Assistant), said telephone system further comprising at least one of a PHS (Personal Handyphone System) and a mobile telephone, said at least one of the PHS and the mobile telephone having a speech communication function with said main device, and wherein said portable terminal is configured to allow the user to simultaneously carry out speech communication using said speech communication function and to carry out data communication using the web page displayed on said display unit.

5. A telephone system as claimed in claim 1, wherein said portable terminal is one of a PHS (Personal Handyphone System) and a mobile telephone, said one of the PHS and the mobile telephone having a speech communication function with said main device, and wherein said portable terminal is configured to allow the user to simultaneously carry out speech communication using said speech communication function and to carry out data communication using the web page displayed on said display unit.

6. A portable terminal for use in a telephone system which includes a main device and a telephone set connected to said main device and which comprises said portable terminal including a display unit, said portable terminal comprising interface means for interfacing said display unit with said main device to present, as an operation screen, an image of said telephone set on a web page displayed on said display unit and to enable to use a function of said telephone set on said portable terminal by an operation on the operation screen displayed on said display unit,
wherein said portable terminal includes a first voice authentication means, in which a user of said portable terminal is authenticated to access said telephone set by said telephone system first attempting to authenticate speech output by said user and received by said portable terminal using voice data stored in a first memory of said portable terminal for said first voice authentication means to determine whether or not there is a match, and if there is not a match, the user of said portable terminal is next attempted to be authenticated by said telephone system by using said main device and said speech output by said user, as forwarded to said main device by said portable terminal, and if both of said first and second voice authentication means do not determine that there is a match, the user is not allowed to use said portable terminal to access said telephone set.

7. A portable terminal as claimed in claim 6, wherein: said portable terminal is a PDA (Personal Digital Assistant).

8. A portable terminal as claimed in claim 6, wherein: said portable terminal is a PDA (Personal Digital Assistant);

said portable terminal comprising a VoIP (Voice over IP) portion for carrying out speech communication with said main device by the use of an IP communication network, and
wherein said portable terminal is configured to allow the user to simultaneously carry out speech communication using said VoIP portion and to carry out data communication using the web page displayed on said display unit.

9. A portable terminal as claimed in claim 6, wherein: said portable terminal is one of a PHS (Personal Handyphone System) and a mobile telephone, said one of the PHS and the mobile telephone having a speech communication function with said main device, and
wherein said portable terminal is configured to allow the user to simultaneously carry out speech communication using said speech communication function and to carry out data communication using the web page displayed on said display unit, and
wherein said portable terminal is configured to allow the user to simultaneously carry out speech communication using said speech communication function and to carry out data communication using the web page displayed on said display unit.

10. A telephone system including a main device and a telephone set connected to said main device, said telephone system comprising a portable terminal including a display unit, said portable terminal comprising interface means for interfacing said display unit with said main device to present, as an operation screen, an image of said telephone set on a web page displayed on said display unit and to enable to use a function of said telephone set on said portable terminal by an operation on the operation screen displayed on said display unit,
wherein said user of said portable terminal is allowed to operate a first type of telephone by inputting a first URL to said main device that provides a virtual display of the first type of telephone on said display unit of said portable terminal, and wherein said user of said portable terminal is allowed to operate a second type of telephone by inputting a second URL to said main device that provides a virtual display of the second type of telephone of said display unit of said portable terminal.

11. A telephone system as claimed in claim 10, wherein said user is only allowed to operate the first type of telephone after a first authentication of said user is performed, and wherein the user is only allowed to operate the second type of telephone after a second authentication of said user is performed.

12. A portable terminal for use in a telephone system which includes a main device and a telephone set connected to said main device and which comprises said portable terminal including a display unit, said portable terminal comprising interface means for interfacing said display unit with said main device to present, as an operation screen, an image of said telephone set on a web page displayed on said display unit and to enable to use a function of said telephone set on said portable terminal by an operation on the operation screen displayed on said display unit,
wherein said user of said portable terminal is allowed to operate a first type of telephone by inputting a first URL to said main device that provides a virtual display of the first type of telephone on said display unit of said portable terminal, and wherein said user of said portable terminal is allowed to operate a second type of telephone by inputting a second URL to said main device that provides a virtual display of the second type of telephone of said display unit of said portable terminal.

13. A portable terminal as claimed in claim 12, wherein the user is only allowed to operate the first type of telephone after a first authentication of said user is performed, and wherein the user is only allowed to operate the second type of telephone after a second authentication of said user is performed.

14. A method of authenticating a user in a telephone system that includes a main device, a telephone set connected to said main device, and a portable terminal including a display unit, an image of said telephone set on a web page displayed on said display unit and to enable to use a function of said telephone set on said portable terminal the method comprising:

receiving speech output by said user and received by said portable terminal;

attempting to authenticate said user by comparing the speech output by said user with voice data stored in a first memory of said portable terminal, to determine whether or not the speech output by said user matches the voice data stored in the first memory;

if the authenticating step indicates a match, then allowing said user to access said telephone set;

if the authenticating step does not indicate a match, then forwarding the speech output by said user to said main device and attempting to authenticate said user by comparing the speech output by said user with voice data stored in a second memory of said main device;

if the second authenticating step indicates a match, then allowing said user to access said telephone set; and if both the first and second authenticating steps do not indicate a match, then not allowing said user to access said telephone set.

15. A method as claimed in claim 14, wherein said portable terminal is a PDA (Personal Digital Assistant).

16. A method as claimed in claim 14, wherein said portable terminal is a PDA (Personal Digital Assistant), wherein each of said portable terminal and said main device comprising a VoIP (Voice over IP) portion for carrying out speech communication with each other by the use of an IP communication network, and wherein said portable terminal is configured to allow the user to simultaneously carry out speech communication using said VoIP portion and to carry out data communication using the web page displayed on said display unit.

17. A method as claimed in claim 14, wherein said portable terminal is a PDA (Personal Digital Assistant), said telephone system further comprising at least one of a PHS (Personal Handyphone System) and a mobile telephone, said at least one of the PHS and the mobile telephone having a speech communication function with said main device, and wherein said portable terminal is configured to allow the user to simultaneously carry out speech communication using said speech communication function and to carry out data communication using the web page displayed on said display unit.

18. A method as claimed in claim 14, wherein said portable terminal is one of a PHS (Personal Handyphone System) and a mobile telephone, said one of the PHS and the mobile telephone having a speech communication function with said main device, and wherein said portable terminal is configured to allow the user to simultaneously carry out speech communication using said speech communication function and to carry out data communication using the web page displayed on said display unit.

* * * * *